Patented Oct. 27, 1953

2,657,229

UNITED STATES PATENT OFFICE 2,657,229

MANUFACTURE OF THIOPHOSPHATE ESTERS

Salvador F. Orochena, Pittsburgh, Pa., assignor to Pittsburgh Coke & Chemical Company, Pittsburgh, Pa., a corporation of Pennsylvania No Drawing. Application December 8, 1950, Serial No. 199,918

7 Claims. (Cl. 260—461)

This invention relates to the manufacture of thiophosphate esters and, more particularly, is concerned with new improvements in procedures for the manufacture of mixed esters of thiophosphoric acid.

Field of invention

The many uses to which thiophosphoric acid derivatives have been put in recent years, e. g., plasticizers and insecticides, have created considerable demand for these compounds. Accordingly, an extensive amount of work has been done to improve existing procedures for their preparation. This is particularly true in the field of thiophosphoric acid mixed esters whose valuable properties, such as with parathion, for use as insecticides has greatly increased the demand for this type of product.

Notwithstanding the large amount of work done, to improve existing methods for the manufacture of the mixed thiophosphate esters, serious problems still exist in obtaining products of substantially good quality, free of by-product esters or reactants and in obtaining the materials in high yield.

Objects

A principal object of the present invention is the provision of new improvements in the manufacture of thiophosphoric acid esters, particularly, the dialkyl monoaryl esters of thiophosphoric acid. Still further objects include:

(1) The provision of such new procedures which eliminate the need for the use of large excesses of alcohol with simultaneous removal of problems of alcohol recovery, in contrast with prior known methods.

(2) The provision of such procedures which make it possible to obtain higher yields of desired product, based upon quantities of reagents used, than has been possible by known processes heretofore.

(3) The production of complex reaction intermediates in the formation of mixed esters of thiophosphoric acid which are relatively more stable than related reaction intermediates prepared in the procedures known heretofore.

(4) The provision of new procedures for the production of stable solutions of dialkoxy thiophosphoryl chlorides.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

General description

These objects are accomplished, according to the present invention, in the process for manufacture of thiophosphoric acid esters having the general formula:

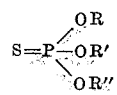

wherein R and R' are lower alkyl radicals, generally but not necessarily the same, and R'' is an organic radical which is the residue of an alcohol or phenol, which comprises reacting a suspension of sodium metal in a liquid hydrocarbon having a boiling point above about 100° C. with a lower alkyl alcohol in a slight excess over the stoichiometric proportions, e. g., an excess of about 0.05 to 0.2 mol of alcohol to form corresponding sodium alkoxide, mixing thiophosphoryl chloride with the resulting reaction mixture in proportions of between about 1 and 2 mols of said sodium alkoxide in said reaction mixture for each mol of thiophosphoryl chloride, allowing said admixed materials to react forming a reaction mixture containing an alkoxy thiophosphorous chloride, mixing a sodium salt of a hydroxy organic compound of the general formula: R''ONa, or the chemical equivalent thereof, with the resulting reaction mixture, allowing the mixed materials to react and recovering the produced thiophosphoric ester from the reaction mixture.

The success of the present invention, as briefly described above, is due primarily to the discovery that, if the sodium alkoxide used as a principal reactant in the process is prepared by reaction of an anhydrous lower alkyl alcohol with a suspension or emulsion of sodium in a liquid hydrocarbon, a reaction mixture, which is peculiarly suited for further processing into thiophosphoric acid esters, is obtained. Thus, in the past, when esters of this type, e. g., parathion, have been prepared through a multistage procedure involving the formation of a dialkoxy thiophosphorous chloride in alcoholic solution, such intermediate solutions have had to be used always immediately after preparation. Thus, if these intermediate materials are allowed to stand for a few hours, the yield of desired products is very poor. On the other hand, using the complex intermediate solutions of the thiophosphoryl halide in accordance with this invention, it has been found possible to keep the intermediate solutions after preparation for at least two days without noticeable change in the overall yield of the final product.

*Example*

A more complete understanding of the procedures involved with this invention may be had by reference to the following example of actual operations, in accordance with the invention, which illustrates the preparation of parathion.

24.2 g. (1.05 mols) of sodium are melted in 300 cc. of toluene. The melted sodium is dispersed in the form of fine particles by strong stirring. Then 52 g. (1.13 mols) of absolute alcohol are added slowly while keeping the temperature around 100° C. In this way, the sodium is converted to sodium ethoxide.

A complex solution containing diethoxy thiophosphoryl chloride is prepared by slow addition of this sodium ethoxide mixture to a mixture of 84.7 g. (0.5 mol) of thiophosphoryl chloride and 300 cc. of toluene, and then the mixture is heated to 75° C. for about two hours.

The resulting solution of diethoxy thiophosphoryl chloride in toluene is added streamwise to 69.5 g. of paranitro phenol suspended in 150 ml. of toluene containing also 46 g. sodium carbonate and 1 g. powdered copper. The mass is thoroughly agitated and maintained at a temperature of 85–90° C. and the ingredients are allowed to react for about four hours. The resulting mixture is washed with dilute sodium carbonate solution to remove unreacted phenol and with water to remove the carbonate. The desired product is obtained by removal of the toluene by steam distillation. 132 g. by weight of parathion having a purity of about 98% (by polarigraphic analysis) are obtained (corresponding to a yield of 90% based on the thiophosphoryl chloride).

*Operational details*

The use of a sodium suspension or emulsion in a liquid hydrocarbon having a boiling point above about 100° C. is essential to the successful operation of this new process. Satisfactory suspensions or emulsions of this type may be prepared in a number of ways. For example, sodium metal in small lumps can be added to thoroughly agitated hydrocarbon heated to a temperature above the melting point of sodium. More detailed procedures for the production of these reagents can be found in the literature, e. g., in the U. S. Patents Nos. 2,394,608; 2,487,333 and 2,487,334.

The exact hydrocarbon used in the formation of the sodium emulsions and as a solvent in the process is not critical. The hydrocarbon should be liquid at room temperature, should be inactive to sodium, and should have a boiling point about 100° C. Examples of suitable hydrocarbons include: toluene, xylene, kerosene, decalin, mineral oil or other comparable hydrocarbons.

Since the process is applicable to the formation of a variety of thiophosphoric esters, any alcohols which react with sodium may be used as one of the reactants. Preferably, the alcohol should be an aliphatic alcohol, e. g., a lower alkyl alcohol, such as methanol, ethanol, 1 or 2-propanol, 1 or 2-butanol, various pentanols, or the like.

Various sodium salts of hydroxy organic compounds or the chemical equivalents thereof, e. g., a mixture of the hydroxy compound with NaOH, $Na_2CO_3$, or the like, may be used in the preparation of the mixed esters. Examples of usable hydroxy organic compounds include: p-nitro phenol; 2,4-dinitrophenol; phenol; 2,4-dichlorophenol; 2 - hydroxy - 4 - nitro naphthalene; 2-methyl-4-nitrophenol; p-cresol; 2-chloro-4-nitrophenol aliphatic alcohols, different from the one used in forming the dialkoxy derivative, glycols, such as ethylene glycol, diethylene glycol, etc.; hydroxy ethers, such as beta-butoxyethanol, methoxyethanol, etc.; heterocyclic compounds, such as 7-hydroxy coumarin, furfuryl alcohol, etc.; hydroxy sulfur compounds, such as beta-hydroxyethyl butyl sulfide; and the like. Of these, the aryl hydroxy compounds are preferred.

Using such reagents, a large variety of the esters of the general class indicated above can be prepared, some specific examples of which are parathion, dimethyl paranitro phenyl thiophosphate, dimethyl phenyl thiophosphate, diethyl parachlorophenyl thiophosphate, methyl ethyl 2,4-dichlorophenyl thiophosphate, and equivalent esters.

In the first stage of the reaction, a slight excess over the stoichiometric proportions of the sodium metal and lower alkyl alcohols, e. g., 0.05 to 0.2 mol in excess of alcohol over this amount, should be employed to produce the corresponding sodium alkoxide. When this reaction mixture is formed, it is reacted with between 1 and 2 mols of sodium alkoxide equivalent contained in the reaction mass for each mol of thiophosphoryl chloride. The exact concentration may be varied, depending upon whether a mono or dialkyl thiophosphorous chloride, or a mixture thereof, is desired to be obtained in the first stage of the reaction. If one mol is used to get the mono compound, a second step, using another mol of a sodium alkoxide, can be used to introduce the second alkoxy group.

After the formation of the intermediate alkoxy thiophosphoryl chloride compound solution, the resulting mixture is reacted with a hydroxy organic compound, e. g., with slightly less than the stoichiometric proportion of the hydroxy compound necessary to replace the remaining halide atoms in the intermediate material. Generally, between 0.45 to 0.49 mol of the hydroxy organic compound is used along with about 0.5 to 2% of a catalyst, such as copper metal or a copper salt, e. g., copper acetate or copper sulfate, for each mol of active ingredient in said intermediate solution or each mol of sodium originally used. Various methods can be employed for bringing the intermediate solution and the hydroxy organic compound into reaction but, preferably, the intermediate mixture is added to the hydroxy compound which is in the form of a suspension in an inert solvent, usually the same hydrocarbon used in the formation of the initial sodium suspension. Suspension of hydroxy organic compounds of between 10 and 30% by weight are especially satisfactory. The hydroxy compound is preferably used as the sodium salt or the equivalent thereof, such as a mixture of the compound with an HCl acceptor, such as NaOH or $Na_2CO_3$.

In carrying out the reaction between the thiophosphorous chloride intermediate and the hydroxy organic compound, a polar solvent in small amount, e. g., 1 to 10% by weight of the total reaction mixture, can be added with advantage to the reaction mixture. Suitable polar solvents include tertiary alkyl alcohols, e. g., tertiary butyl, amyl or octyl alcohols, and alkyl ketones, e. g., acetone, ethyl butyl ketone, or dipropyl ketone.

Conclusion

The present invention, as described above, provides new improvements in the general field of alkoxy thiophosphorous chloride and thiophosphoric acid mixed ester production. By using these new procedures, it is possible to produce desired products in higher yield than has been possible heretofore. At the same time, because of the greater stability of intermediates provided by the invention, greater flexibility in reaction procedures is possible. While the new processes are usable in the formation of a large variety of thiophosphoric acid mixed esters, the invention is particularly useful in the formation of dialkyl monoaryl esters of thiophosphoric acid.

I claim:

1. A process for the manufacture of thiophosphoric acid derivatives having the general formula:

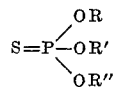

wherein R and R' are alkyl radicals and R'' is an organic radical selected from the group consisting of mono- and dicyclic aryl radicals, which comprises the steps of reacting a suspension of sodium metal in a liquid hydrocarbon having a boiling point above about 100° C. with a slight excess of up to 0.2 mols of an alkyl alcohol over the equimolecular proportion forming a complex mixture containing the corresponding sodium alkoxide, mixing thiophosphoryl chloride with the resulting reaction mixture in the proportion of between one and 2 mols of said sodium alkoxide compound for each mol of thiophosphoryl chloride in said reaction mixture, allowing said admixed materials to react forming a reaction mixture containing an alkoxy thiophosphoryl chloride compound, mixing a sodium salt of an aryl hydroxy compound of the general formula R''ONa, where R'' has the meaning stated above, with the resulting reaction mixture, allowing the mixed materials to react and recovering a thiophosphoric ester from the reaction mixture.

2. A process for the manufacture of lower dialkyl monoaryl thiophosphates which comprises reacting a suspension of sodium metal in a liquid hydrocarbon having a boiling point above about 100° C. with a lower alkyl alcohol in proportion of 1.05 and 1.2 mols of alcohol for each mol of sodium forming a complex mixture containing the corresponding sodium alkoxide, mixing thiophosphoryl chloride with said complex mixture in proportions of about one mol of chloride for each two mols of sodium originally used at a temperature below 90° C., mixing a sodium salt of a phenol and a copper catalyst with the resulting reaction mixture, allowing the admixed substances to react at a temperature between 30 and 100° C. and recovering a dialkyl monoaryl thiophosphate from the resulting mass.

3. A process for the production of parathion which comprises reacting a suspension of sodium metal in a liquid hydrocarbon having a boiling point above about 100° C. with ethanol in proportion of 1.05 and 1.2 mols of ethanol for each mol of sodium, adding the resulting suspension streamwise to thiophosphoryl chloride, continuing the streamwise addition until the equivalent of two mols of sodium ethoxide has been added for each mol of said chloride, allowing the admixed materials to react at a temperature between about 50° to 80° C., adding 0.5 to 5% of a copper salt and 0.45 to 0.49 mol of a molar excess of sodium paranitrophenate to the resulting reaction mixture, allowing the mixed materials to react at a temperature between 80° and 100° C., and recovering parathion from the reaction mixture by distilling off said liquid hydrocarbon.

4. A process for the manufacture of stable solutions of dialkoxy thiophosphoryl chlorides which comprises reacting a suspension of sodium metal in a liquid hydrocarbon having a boiling point above about 100° C. with a lower alkyl alcohol in the proportion of 1.05 and 1.2 mols of alcohol for each mol of sodium, reacting thiophosphoryl chloride in proportion of 0.45 and 0.49 mol for each mol of sodium originally used with the resulting complex mixture and collecting the resulting solution of dialkoxy thiophosphoryl chloride dissolved in said hydrocarbon.

5. A process as claimed in claim 1 wherein said reaction between said complex mixture and thiophosphoryl chloride is carried out in the presence of a small amount of a polar solvent from the group consisting of tertiary alkyl alcohols and lower alkyl ketones.

6. A process as claimed in claim 5, wherein said lower alkyl ketone is acetone.

7. A process as claimed in claim 5, wherein said tertiary alkyl alcohol is tertiary butyl alcohol.

SALVADOR F. OROCHENA.

References Cited in the file of this patent

UNITED STATES PATENTS

| Number | Name | Date |
|---|---|---|
| 1,844,408 | Nicolai | Feb. 9, 1932 |
| 2,471,464 | Toy | May 31, 1949 |
| 2,520,393 | Fletcher | Aug. 29, 1950 |
| 2,575,224 | Manske | Nov. 13, 1951 |
| 2,575,225 | Manske | Nov. 13, 1951 |

OTHER REFERENCES

Schrader, B. I. O. S. Final Report No. 1808, released October 4, 1948, pages 7–10.

Thurston, Organic Chemical Intermediates for Insecticides, Fungicides and Rodenticides, FIAT Final Report 949, page 20 (1947).